US008880300B2

(12) United States Patent
Gamble et al.

(10) Patent No.: US 8,880,300 B2
(45) Date of Patent: Nov. 4, 2014

(54) OUTDOOR POWER EQUIPMENT UNIT WITH CONDITION RESPONSIVE ELECTRONIC CONTROL OF TRACTION DRIVE SYSTEM

(75) Inventors: Jesse R. Gamble, Burnsville, MN (US);
Kyle C. Bjorkman, Hugo, MN (US);
Alexander S. Frick, Burnsville, MN (US)

(73) Assignee: The Toro Company, Bloomington, MN (US)

( * ) Notice: Subject to any disclaimer, the term of this patent is extended or adjusted under 35 U.S.C. 154(b) by 269 days.

(21) Appl. No.: 13/607,682

(22) Filed: Sep. 8, 2012

(65) Prior Publication Data

US 2014/0069072 A1    Mar. 13, 2014

(51) Int. Cl.
*E02F 3/04* (2006.01)
*G06F 7/70* (2006.01)
*A01D 34/00* (2006.01)
*A01D 34/66* (2006.01)

(52) U.S. Cl.
CPC .............. *A01D 34/006* (2013.01); *A01D 34/66* (2013.01)
USPC ............................................. 701/50; 60/445

(58) Field of Classification Search
USPC ................ 37/347, 348; 172/2–11; 56/10.2 R, 56/10.2 A–10.2 H, 13.5, 14.6; 460/6, 7, 460/116, 3, 119; 123/396, 352; 417/216; 60/395, 431, 447, 449, 428, 421, 426, 60/432, 445; 701/22, 50
See application file for complete search history.

(56) References Cited

U.S. PATENT DOCUMENTS

| | | | |
|---|---|---|---|
| 3,605,903 A | 9/1971 | Glesmann | |
| 3,914,938 A | 10/1975 | Cornell et al. | |
| 3,963,378 A | 6/1976 | McMillan | |
| 4,180,979 A | 1/1980 | Cornell | |
| 4,455,770 A | 6/1984 | Presley | |
| 4,523,892 A | 6/1985 | Mitchell et al. | |
| 5,525,043 A | 6/1996 | Lukich | |
| 5,996,342 A | 12/1999 | Khan et al. | |
| 6,675,577 B2 | 1/2004 | Evans | |
| 7,648,413 B2 | 1/2010 | Duquesne et al. | |

*Primary Examiner* — Robert Pezzuto
(74) *Attorney, Agent, or Firm* — James W. Miller (57) ABSTRACT

An outdoor power equipment unit comprises a self-propelled mower having a hydraulic traction drive system. When engine load exceeds a predetermined percentage of full load, a controller automatically reduces the stroke of a variable displacement pump in the traction drive system to reduce the ground speed of the mower without the operator having to change the position of the traction pedal. This reduces engine load to enhance continued good cutting performance. At any time, the controller can take the same actions to reduce ground speed if an excessively high temperature in a fluid used in a cooling system on the mower is detected, or if excessive loads on the mower decks of the mower are detected, or both.

11 Claims, 4 Drawing Sheets

OUTDOOR POWER EQUIPMENT UNIT WITH CONDITION RESPONSIVE ELECTRONIC CONTROL OF TRACTION DRIVE SYSTEM

TECHNICAL FIELD

This invention relates to outdoor power equipment units which are self-propelled by a hydraulic traction drive system operated by a prime mover such as an internal combustion engine. More particularly, this invention relates to a control system for maximizing the efficient use of engine horsepower over widely varying load conditions imposed on the engine by a work implement carried by such an outdoor power equipment unit.

BACKGROUND OF THE INVENTION

The field of outdoor power equipment comprises a wide variety of units that perform various types of work operations in an outdoor environment. A common characteristic of such units is that they carry a prime mover of some type thereon that powers a traction drive system. In turn, the traction drive system powers one or more ground engaging traction drive members, such as wheels or endless tracks, which cause the unit to be self-propelled over the ground.

The traction drive systems of outdoor power equipment units often comprise one or more hydraulic pumps that are driven by the prime mover. The pressurized hydraulic fluid from such pumps is supplied to one or more hydraulic motors that rotate the traction drive members. The hydraulic pumps are usually variable displacement pumps whose output is infinitely variable from zero pump displacement to maximum pump displacement. This allows the operator to smoothly control the ground speed of the unit by infinitely controlling the pump output through a user operated ground speed control such as a foot operated traction pedal. The traction pedal can be either mechanically linked to the traction drive pump(s) or electronically linked through a fly-by-wire control system that employs an electronic controller for that purpose.

In addition to the above-described hydraulic traction drive system, outdoor power equipment units are equipped with at least one work implement for performing some type of work operation. For example, when the unit is a mower, the unit will be equipped with one or more grass cutting units or mower decks for cutting grass. When the unit is a trencher, the unit will be equipped with an endless trenching chain or circular cutting disc or wheel for cutting a trench in the ground. Such work implements are also ultimately driven by the same prime mover carried on the unit that powers the traction drive system. Like the traction drive system, the work implements are often hydraulically driven from the prime mover using at least one additional hydraulic pump connected to the prime mover for supplying pressurized hydraulic fluid to one or more additional hydraulic motors that rotate the work implements.

One difficulty experienced in the operation of outdoor power equipment units of this type is that the load experienced by the work implements can vary widely over a short period of time, thus causing the load demands on the engine to rise or fall quickly as well. For example, if the unit comprises a mower, the mower may at one moment be cutting grass that is relatively short and sparse and then at the next moment move into an area where the grass is much longer and thicker than before. When this happens, the available engine horsepower may be insufficient to both maintain the vehicle speed and to cut the longer and thicker grass properly.

If the operator tries to maintain the mower ground speed at the same speed when cutting longer and thicker grass as when cutting shorter and sparser grass, then the quality of cut being provided by the mower will decline. In other words, the grass will not be cut as evenly and uniformly as before at and after the point at which the available engine horsepower is fully utilized. When encountering this situation, the operator can alternatively listen for the decrease in engine speed, known as engine lug, which accompanies the situation where the load requirements on the engine from the traction drive and the work implements exceed the available horsepower. When the operator hears or otherwise detects from the performance of the mower that the engine is lugging down, the operator can then manually ease up on the traction pedal to slow the mower down to decrease the traction drive load in an attempt to maintain the quality of cut. However, this latter approach requires a very skilled operator who is constantly attentive to engine lug to be even somewhat successful. Even with a skilled and attentive operator, the inevitable slow response time of a human being means that the available engine horsepower is still often exceeded when the instantaneous traction drive and work implement loads are greater than that horsepower—the operator tends to react too slowly.

The situation is even worse when a less experienced or skilled operator is operating the mower. In situations where the available engine horsepower is less than the load requirements and the engine begins to lug down, the natural reaction of most inexperienced operators is to push further down on the traction pedal as they would in an automobile or car whose engine exhibits the same behavior. However, in an outdoor power equipment unit, this only exacerbates the situation by increasing the load imposed by the traction drive system. The result is an engine stall and a complete stoppage of the mower.

In an attempt to assist the operator to better utilize the available engine horsepower, various control systems and methods have been proposed that automatically control the operation of the traction drive system in response to a decline in engine speed below a predetermined reference engine speed. For example, U.S. Pat. No. 6,675,577 to Evans discloses such a system for use on vehicles for industrial and agricultural use, such as compact utility tractors. In Evans, the speed of the engine is sensed by a sensor. When the speed of the engine drops below a target value to thereby indicate the beginning of excessive engine lug caused by load, the control system disclosed in Evans automatically reduces the stroke of a hydraulic pump that powers the traction drive system to automatically reduce the vehicle speed and prevent engine stall. Consequently, this relieves the operator from having to manually detect engine lug and to then manually ease off the traction pedal in an attempt to do the same thing.

A control system such as that disclosed in Evans has advantages. It assists all operators, but particularly less skilled and inexperienced operators, in the efficient operation of the outdoor power equipment unit by preventing the instantaneous load requirements on the engine from exceeding the available engine horsepower. Thus should greatly reduce, though probably not entirely eliminate, most engine stalls. In addition, it should enhance productivity through higher average horsepower utilization during the operation of the outdoor power equipment unit.

However, a system as disclosed in Evans is incapable of addressing every load situation experienced during the operation of the outdoor power equipment unit. There will be times when the load imposed by the work implements may be so extreme that it would require slowing the ground speed too much, thereby creating an unsafe operational condition. Moreover, a system as in Evans ignores the fact that many outdoor power equipment units have other load drains on the engine that arise from the operation of other components besides the traction drive system and the work implement. Accordingly, a control system that would also take into account these issues would be a further advance in the art.

SUMMARY OF THE INVENTION

One aspect of this invention relates to an outdoor power equipment unit which comprises a frame carrying a work implement for performing a ground or turf grooming or working operation. The frame also carries a prime mover whose speed is set by an operator using an adjustable throttle. A traction drive system driven by the prime mover is provided for moving the frame over the ground at an adjustable ground speed that is established by a setting provided by an operator using an adjustable speed control. An implement drive system is driven by the prime mover for moving the work implement in a grooming or working operation. A fan drive system is driven by the prime mover for powering a cooling fan that cools one fluid in at least one cooling system carried on the frame. A sensor provides an indicator of prime mover load during the working operation being performed by the work implement. A sensor provides a temperature reading of the fluid during the working operation being performed by the work implement. An electronic controller is also provided for receiving the prime mover load indicator and temperature inputs from the sensors and for regulating the ground speed of the frame when the prime mover load indicator input is greater than a predetermined percentage of prime mover full load. The electronic controller regulates the speed of the frame by automatically reducing an output speed of at least one variable speed member contained in the traction drive system to reduce the ground speed of the frame without requiring that the speed control setting established by the user through the position of the speed control be manually changed by the user, by automatically shutting off the cooling fan for periods of time that the temperature input is below a predetermined first limit thereof but resuming operation of the cooling fan when the temperature input reaches or exceeds the first limit thereof, and by maintaining the automatically reducing and automatically shutting off actions until the prime mover load indicator input drops back below the predetermined percentage of prime mover full load.

Another aspect of this invention relates to an outdoor power equipment unit that comprises a frame carrying a work implement for performing a ground or turf grooming or working operation. The frame also carries a prime mover whose speed is set by an operator using an adjustable throttle. A traction drive system is driven by the prime mover for moving the frame over the ground at an adjustable ground speed that is established by an operator using an adjustable speed control. An implement drive system driven by the prime mover is provided for moving the work implement in a grooming or working operation. A fan drive system driven by the prime mover is provided for powering a cooling fan that cools one fluid in at least one cooling system carried on the frame. A first sensor provides an indicator of prime mover load during the working operation being performed by the work implement. A second 1 sensor provides an indicator of work implement load during the working operation being performed by the work implement. A temperature sensor provides a temperature reading of the fluid during the working operation being performed by the work implement. An electronic controller receives the prime mover load indicator, the work implement load indicator, and temperature inputs from the sensors and automatically reduces an output speed of at least one variable speed member contained in the traction drive system to reduce the ground speed of the frame without requiring that the speed control setting established by the operator through the position of the speed control be manually changed by the operator. The controller does this whenever the following conditions are present: 1.) when the prime mover load indicator input is greater than a predetermined percentage of prime mover full load to thereby reduce prime mover load to enhance the continued ability of the work implement to conduct the grooming or working operator; and 2.) additionally either when the work implement load indicator input reaches or exceeds a limit to thereby reduce prime mover load to prevent damage to the work implement or when the temperature input reaches or exceeds a limit to reduce prime mover load to prevent damage to the cooling system or any components cooled thereby.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
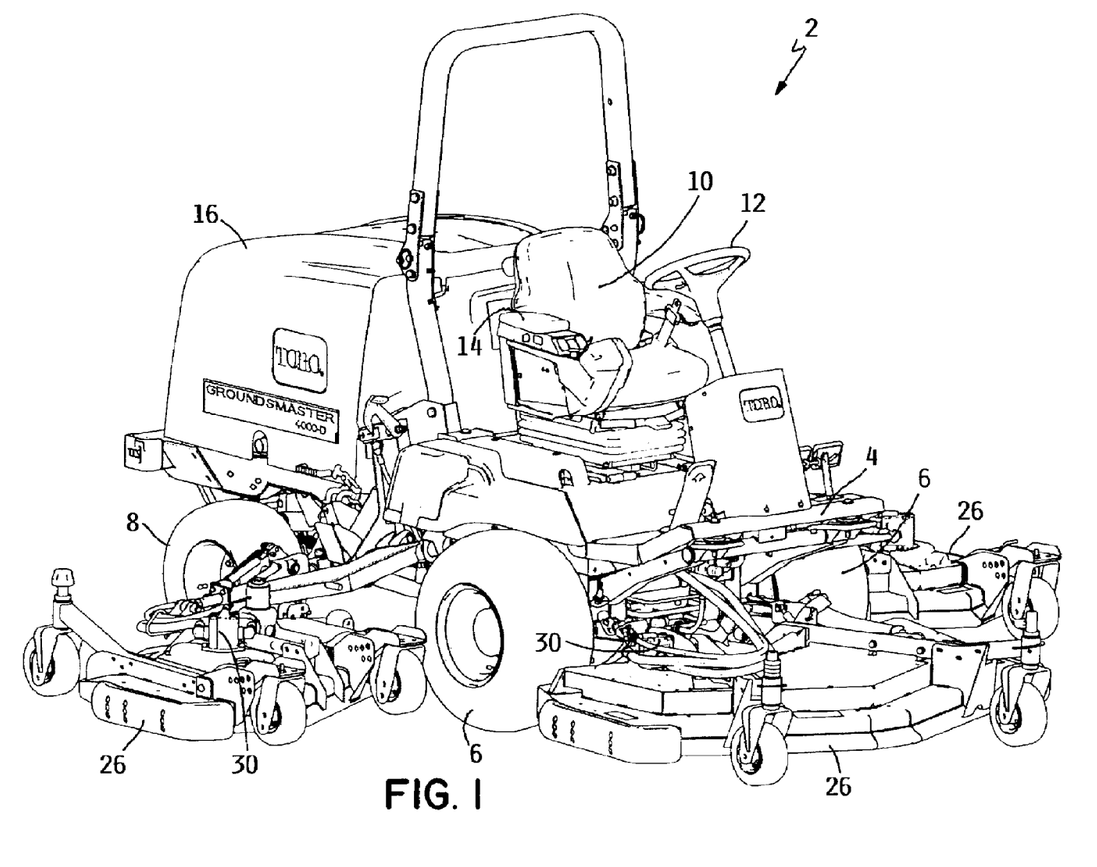
FIG. 1 is a perspective view of one type of outdoor power equipment unit, namely a self-propelled mower, with which the control system and method of this invention may be used.

FIG. 1 is a perspective view of one type of outdoor power equipment unit that may effectively utilize the control system and method of this invention. The specific outdoor power equipment unit shown in FIG. 1 comprises a mower 2. Mower 2 includes a frame 4 that is supported for movement over the ground by a pair of front wheels 6 and a pair of rear wheels 8. Frame 4 includes an operator's station having a seat 10 for supporting a seated operator, a steering wheel 12 that the operator uses to steer and guide mower 2, and a control console 14 having various controls for controlling the operation of various components of mower 2. Frame 4 also carries a prime mover thereon, such as an internal combustion engine 15 (FIG. 2), that is positioned behind the operator's station and that is enclosed within an engine cowl or hood 16. The prime mover could alternatively comprise an electric motor that is powered by a battery pack, or by an engine generator/battery pack hybrid system, or by a fuel cell, etc.

Figure 2:
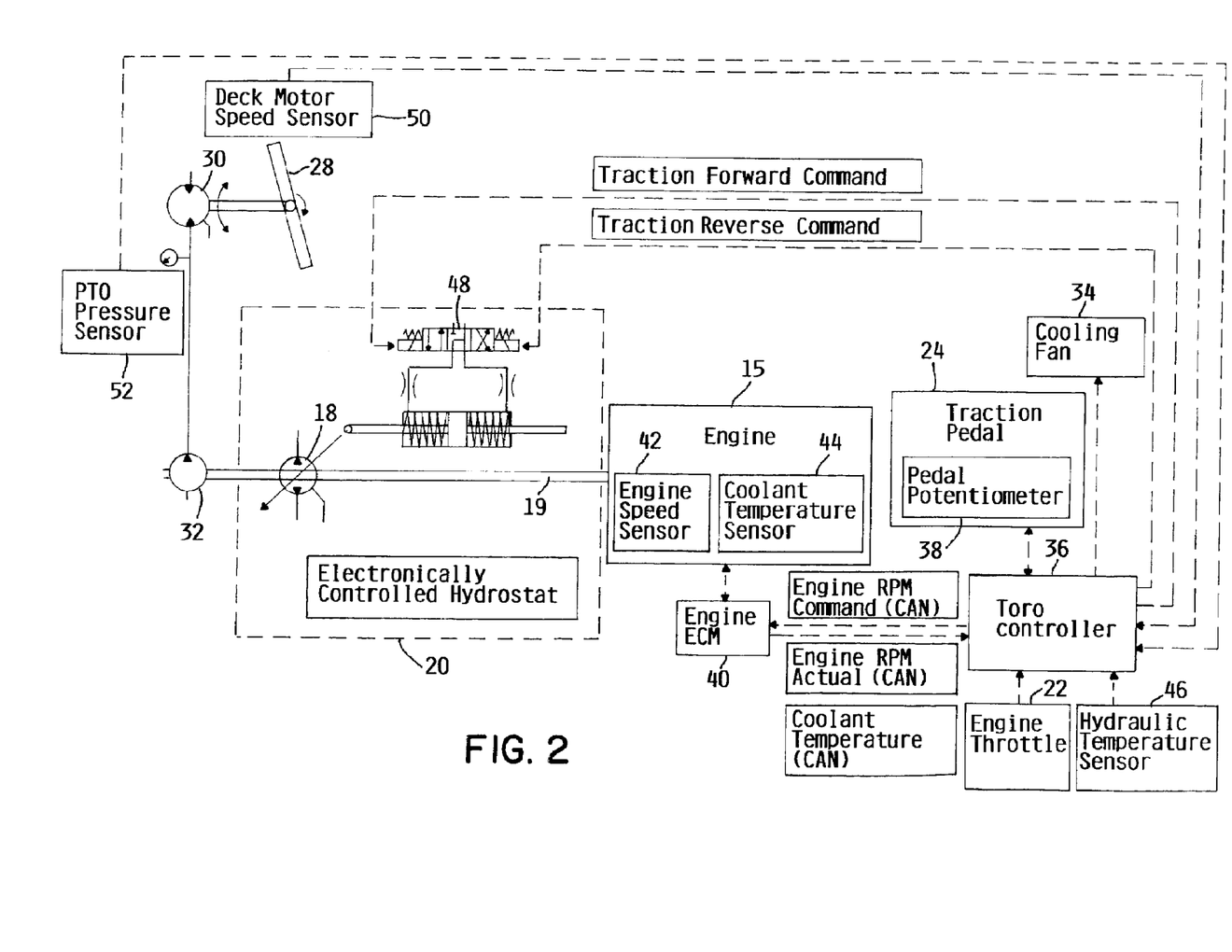
FIG. 2 is a schematic view of the control system of this invention as applied to the outdoor power equipment unit shown in FIG. 1.

Mower 2 includes a traction drive system for causing mower 2 to be self-propelled across the ground. In one embodiment thereof, the traction drive system operates to rotate the pair of front wheels 6 such that front wheels 6 are the drive wheels. Rear wheels 8 could be unpowered in a 2WD configuration or powered in a 4WD configuration. In either event, rear wheels 8 are operatively connected to steering wheel 12 to comprise the steerable wheels of mower 2. The traction drive system includes at least one hydraulic variable displacement traction drive pump 18 that powers at least one hydraulic traction drive motor (not shown) for operating front drive wheels 6 (as well as rear wheels 8 if a 4WD configuration is used). If a single traction drive motor fed by a single traction drive pump 18 is used, such a drive motor may be operatively connected to both front drive wheels 6 through a differential having a pair of output shafts or axles that mount the drive wheels. Traction drive pump 18, the traction drive motors and the differential are often integrated together within a common housing such with the combination thereof being known as a hydrostatic transmission 20 (FIG. 2). In any event, any hydraulic pump 18 used for traction drive purposes is coupled through a drive train to a power take off (PTO) shaft 19 of engine 15.

Referring now to FIG. 2, the operational controls available to the operator include an engine throttle 22 by which a reference engine speed can be set for use during a mowing operation. Typically, the operator sets the reference engine speed to a fixed value, e.g. 2,600 rpm, which is selected to provide adequate power for mower operation. This throttle position is normally left unchanged while mowing. In addition, the displacement of traction drive pump 18 in the traction drive system is infinitely variable by the operator using a ground speed control of some type, normally a foot operated traction pedal 24. When traction pedal 24 is in neutral and is not being depressed by the operator, the displacement of traction drive pump 18 is set to zero, no pressurized fluid is being supplied to the traction drive motor(s) in the traction drive system, and mower 2 is stationary. As the operator pushes down on traction pedal 24, the displacement of traction drive pump 18 is progressively and infinitely increased all the way up to the maximum pump displacement, to thereby begin and then progressively increase the speed of rotation of the traction drive motor(s) to smoothly control the ground speed of mower 2. As noted earlier, the use of traction pedal 24 to control ground speed happens with throttle 22 set to operate engine 15 at the selected reference engine speed. Traction pedal 24 can also be manipulated to operate the hydraulic traction drive system to achieve either forward or reverse operation of mower 2.

The outdoor power equipment unit with which this invention is intended to be used also includes at least one work implement for performing a work operation. Since the example of such a unit disclosed herein is a mower, the work implement in this case comprises a plurality of rotary mower decks 26 that are carried by frame 4 of mower 2 as best shown in FIG. 1. Each mower deck 26 encloses one or more grass cutting blades 28 (FIG. 2) that rotate about vertical axes in substantially horizontal cutting planes. Each mower deck 26 has a cutting blade drive system for rotating such cutting blades.

While different types of cutting blade drive systems could be used, in the mower embodiment disclosed herein the cutting blade drive system includes at least one hydraulic blade drive motor 30 on each mower deck. If mower deck 26 has a single cutting blade 28, blade drive motor 30 would typically be directly coupled to the single cutting blade. If mower deck 26 has multiple cutting blades 28, blade drive motor 30 could operate the multiple cutting blades through a direct connection to one of the blades and with some type of belt drive system to the other blades. A fixed displacement hydraulic blade drive pump 32 is also coupled to the PTO shaft 19 of engine 15 to be driven thereby. The fixed displacement blade drive pump 32 supplies pressurized fluid to the hydraulic motors 30 for all the cutting decks 26 to operate the cutting blades 28 at a predetermined reference speed of rotation that is selected to provide excellent grass cutting performance.

Mower 2 is provided with a cooling fan 34 for cooling both the engine coolant fluid as well as the hydraulic fluid used in the various hydraulic drive systems, such as the traction drive system and the cutting blade drive systems, provided on mower 2. The hydraulic fluid used in the various hydraulic drive systems typically is supplied from a common reservoir of hydraulic fluid. Cooling fan 34 is rotated by at least one hydraulic fan drive motor (not shown) to draw cooling air through screen portions of engine hood 14 and to send such cooling air over and/or through a pair of stacked heat exchangers (not shown). One heat exchanger is used to cool the engine coolant fluid and the other heat exchanger is used to cool the hydraulic fluid. The fan drive motor that powers cooling fan 34 is supplied with hydraulic fluid from a fan drive hydraulic pump (not shown) that is also driven by the PTO shaft 19 of engine 15.

The control system and control method of this invention is best described with reference to FIGS. 2 and 3 hereof. The control system comprises a microprocessor based electronic controller 36 that is carried on frame 4 of mower 2 and that is powered from the electrical system of mower 2. Controller 36 may be the usual controller found on most mowers for controlling the operation of the traction drive system, mower decks 26, engine 15, cooling fan 34, etc.

As best shown in FIG. 2, controller 36 of the control system receives various inputs. One input comes from the setting of throttle 22 and represents the reference engine speed as selected by the operator by appropriate positioning of throttle 22 by the operator. In addition, controller 36 receives two additional inputs from a separate electronic engine control module (ECM) 40 operatively connected between controller 36 and engine 15. These two inputs comprise the actual (i.e. instantaneous) rotational speed of engine 15 as reported by an engine speed sensor 42 and the actual temperature of the engine coolant fluid contained in the engine cooling system as reported by an engine coolant fluid temperature sensor 44. Another temperature input to controller 36 comes from a hydraulic temperature sensor 46 that senses and reports to controller 36 the actual temperature of the hydraulic fluid used in the various hydraulic traction, blade and fan drive systems found on mower 2. Since the temperature of the hydraulic fluid as it exits the traction drive motor tends to be the hottest of any location in the various hydraulic drive systems, hydraulic temperature sensor 46 is desirably located at some spot in the return flow path leading from the traction drive motor back to the hydraulic reservoir.

An additional input to controller 36 comprises the setting of traction pedal 24 as sensed by a potentiometer 38 or any suitable sensor coupled to traction pedal 24. This information is used by controller 36 to electronically control the displacement of traction drive pump 18 contained in the hydraulic traction drive system to nominally achieve the ground speed commanded by the position of traction pedal 24. For example, if the operator depresses traction pedal 24 far enough to achieve a desired ground speed of say 2 mph, controller 36 acts on traction drive pump 18 through a valve 48 to change and maintain the swash plate position of traction drive pump 18 to provide the commanded ground speed. As long as the operator maintains traction pedal 24 in a constant position, this operator selected ground speed will be maintained constant by controller 36 assuming the automatic ground speed adjustments provided by the control method of this invention, as will be described hereafter, have not been invoked. Mower 2 preferably includes a cruise control system which when activated by the operator will maintain a constant ground speed as set by the operator through the setting of traction pedal 24 without the operator having to thereafter continually maintain foot pressure on traction pedal 24.

A final set of two inputs to controller 36 comprise two measures or indicators of the actual cutting load being experienced by mower decks 26. The first input is the actual speed of rotation of the cutting blades on at least one of mower decks 26. This blade speed input can be effectively represented by the actual speed of rotation of the output shaft of the hydraulic blade drive motor that is rotating the cutting blades as reported by a speed sensor 50 associated with such drive motor output shaft since there is normally a one to one relationship between the speed of rotation of the output shaft of blade drive motor 30 and the speed of rotation of the blades. However, a sensor that alternatively measures the speed of rotation of the cutting blades in a more direct fashion could also be used. The second of the final two inputs is the actual hydraulic pressure in the incoming pressurized hydraulic flow to blade drive motor 30 that is rotating the cutting blades 28 as reported to controller 36 by a PTO pressure sensor 52. Both the blade speed input as well as the PTO pressure input could be used in the method of the invention as duplicate indicators of mower deck load, or the inputs could be used in the alternative, i.e. one could use either the blade speed input or the PTO pressure input but not both together. PTO pressure sensor 52 could be placed anywhere in the flow to blade drive motor 30 including back on the main fluid supply manifold carried on mower 2.

For simplicity, FIG. 2 depicts mower deck load sensing in conjunction with only a single mower deck. The Applicants have found that the front center mower deck on mower 2 shown in FIG. 1, namely the mower deck 26 that is in front of front drive wheels 6, typically experiences heavier cutting loads than the two trailing wing mower decks. Thus, the mower deck load sensing is preferably done on the front center mower deck. However, the deck load sensing could be done on any of the other or on all of the mower decks 26 if so desired.

Figure 3:
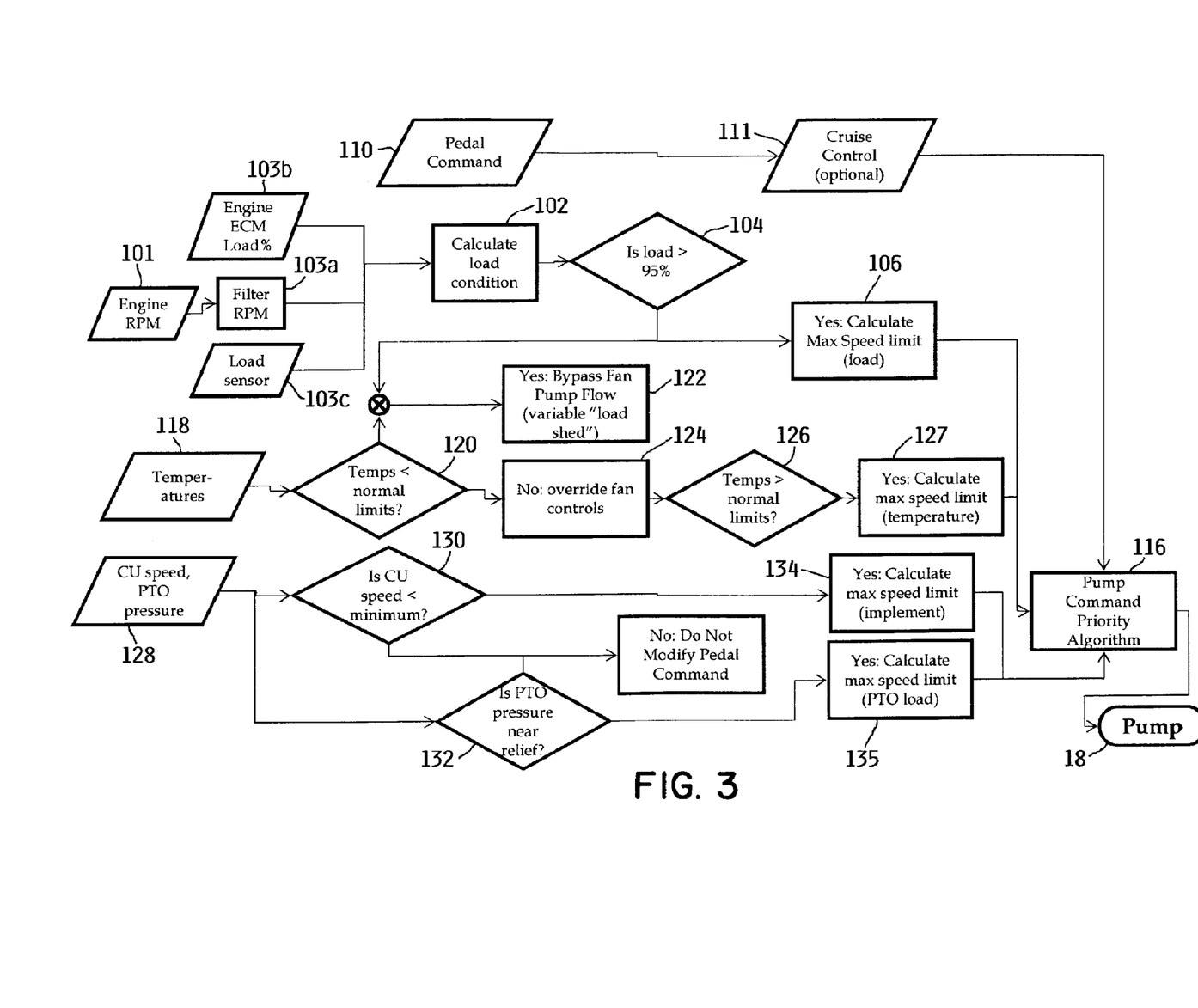
FIG. 3 is a flow chart illustrating the operational steps of the method performed by the control system of this invention.

Turning now to the operation of the control system according to the method of this invention, FIG. 3 depicts the steps and logic of such method in flow chart form. The overall function of the control system of this invention is to automatically reduce the stroke of to thereby reduce the displacement of traction drive pump 18 to temporarily slow the ground speed of mower 2 from what is otherwise being commanded by traction pedal 24 in response to certain sensed operational conditions. These sensed operational conditions comprise a high load (more than 95% of full load) or overload (more than 100% of full load) on engine 15 of mower 2, excessive temperatures in either or both of the engine coolant fluid or hydraulic fluids used on mower 2, and excessive mower deck loads. When such conditions are sensed and reported to controller 36, controller 36 automatically reduces the displacement of traction drive pump 18 to automatically slow, if need be, the ground speed of mower 2 without requiring any change in the traction pedal position that is being maintained by the operator. This reduces the load imposed on engine 15 by the traction drive system to allow the available engine power to be more efficiently utilized to correct the sensed operational conditions.

Referring to FIG. 3, one of the sensed operational conditions as shown in block 102 is the actual amount of load on engine 15 expressed as a percentage of the maximum load that can be adequately handled by engine 15, referred to as 100% load or as full load herein, when engine 15 is rotating at the reference engine speed established by the setting of throttle 22. During the large majority of the time that mower 1 is in operation cutting grass, the actual engine load will be significantly less than full load. However, as mower 2 gets into certain grass cutting situations, such as cutting long and thick grass with traction pedal 24 set to obtain a relatively high ground speed, the load on engine 15 will potentially approach or even exceed full load. Thus, in logic block 104, the actual load on engine 15 is compared to full load on engine 15 to determine if the actual load on engine 15 exceeds some threshold that is close to but below full load. In one embodiment of this invention, the threshold chosen is that of 95% of full load, but this threshold could obviously be varied up or down.

Rather than sense engine load directly, the method of this invention preferably uses the actual rotational speed of engine 15 to detect engine slowing (i.e. engine lug) as a proxy for engine load. Actual engine speed being reported at block 101 by engine speed sensor 42 is passed at block 103a through a signal filter that is a combination of low-pass filtering and signal smoothing designed to eliminate false detections of engine speed droop or recovery. When the reference engine speed has a particular value, such as the 2600 rpm figure mentioned earlier in conjunction with mower 2 shown herein, 95% engine load will be encountered when the actual engine speed has decreased a selected amount below the reference engine speed. For example, the Applicants have determined that when mower 2 shown herein is equipped with a particular type of engine with 2600 rpm being the usual reference engine speed that would be used by the operator for mowing with this engine, 95% load will be encountered when engine 15 has slowed by 40 rpm to 2560 rpm. Block 102 takes the filtered actual engine speed from block 103 and calculates the actual engine load condition using the premise for the example described herein that 95% of full load is present when the filtered actual engine speed is at 2560 rpm with load increasing further above 95% as rpm drops below the 2560 rpm level. The actual engine load calculation at block at block 102 is passed to logic block 104 in controller 36 to determine if the actual load has reached 95% of full load.

As noted above, as rpm progressively drops even further below 2560 rpm, engine load increases up to full load and then increases beyond full load into an overload condition. After controller 36 determines that engine load has exceeded 95%, the actual engine load condition from block 102 represented by the amount of the engine speed droop below 2560 rpm is taken into consideration by controller 36 to calculate a maximum ground speed for mower 2 as shown at block 106. The calculated maximum ground speed obtained in block 106 is one designed to lower the load imposed by the traction drive system sufficiently to allow engine load to decrease back below 95% of full load by permitting the actual engine speed to move back up above 2560 rpm to the reference engine speed of 2600 rpm. As an example, controller 36 might determine in block 106 that the maximum ground speed for a particular engine load condition being reported by block 102 might be 1.5 mph.

The maximum ground speed calculated at block 106 is then passed to a pump command priority algorithm block 116 having a logic block 108 where it is compared to the actual ground speed of the vehicle. See FIG. 4. Again, the actual ground speed of mower 2 could be measured and reported in many ways, but the position of traction pedal 24 as represented at block 110, or alternatively the ground speed setting being maintained by the cruise control system when such system is active as represented at block 111, can conveniently be used as a proxy for mower ground speed. If traction pedal 24 is set to provide a ground speed of 2 mph, it is assumed that the actual ground speed of mower 2 is in fact 2 mph. Thus, at logic block 108, controller 36 compares the actual ground speed represented by the position of traction pedal 24 at block 110 or by the cruise control system at block 111 to the calculated maximum ground speed obtained from block 106. If the actual ground speed of mower 2 as obtained from block 110 or 111 (depending on which is being used) is lower than the calculated maximum ground speed as shown by the Yes answer at block 112, controller 36 does nothing to further reduce the ground speed of mower 2. However, as shown by the No answer at block 112, if the actual ground speed of mower 2, e.g. 2.0 mph, is higher than the calculated maximum ground speed of mower 2, e.g. 1.5 mph, then controller 36 takes the calculated maximum ground speed, converts that ground speed into a modified set point for the transmission as shown at block 114 (in this case a modified set point for the traction drive pump 18), and then applies this modified set point through a PID control loop at block 115 to an actuator that changes the power drain of the transmission (in this case to valve 48 that destrokes or reduces the displacement of pump 18).

Figure 4:
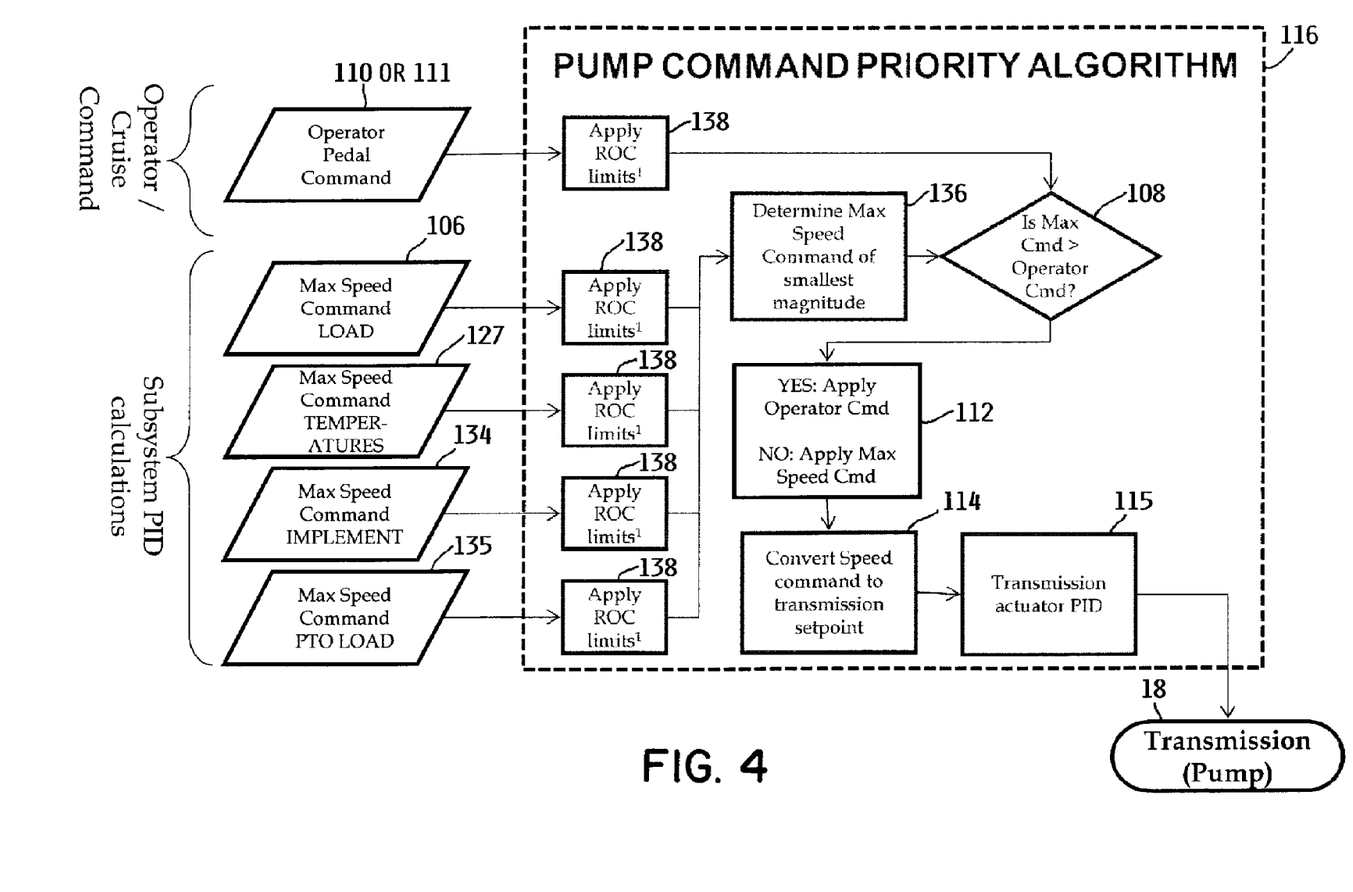
FIG. 4 is a flow chart providing further detail as to the operational steps of the pump command priority algorithm block contained in the flow chart of FIG. 3.

Assuming no lower maximum ground speeds are being received at block 116 as described hereafter, the calculated maximum ground speed at block 106 that is passed to block 116 and to logic block 108 therein will be used to reduce the displacement of traction drive pump 18 by an amount sufficient to obtain the lowered maximum ground speed, namely the 1.5 mph instead of the 2 mph being commanded by traction pedal 24 (or by the setting of the cruise control system if such is active). The operator need do nothing to traction pedal 24 (or the cruise control setting) and can simply maintain traction pedal 24 at the 2 mph setting by maintaining the same foot pressure on traction pedal 24. Controller 36 will automatically reduce the stroke of traction drive pump 18 to reduce the pump displacement to slow mower 2. This decreases the load on engine 15 from the traction drive to reduce the overall engine load and thereby preserve the quality of cut being performed by mower decks 26.

In effect, the control system of this invention takes over for the operator and does not require that the operator pay attention to the sound of engine 15 or to manually try and slow mower 2 down when engine lug is detected either through sound or in some other manner. Controller 36 does it for him or her. When the load on engine 15 is decreased in this manner and the actual engine rpm returns to the reference engine speed of 2600 rpm, controller 36 will then cease the corrective modification it had previously applied and will then increase the stroke of traction drive pump 18 to increase the pump displacement to achieve whatever ground speed is being commanded by the setting of traction pedal 24.

The operation of the control system and method of this invention as set forth above could be used alone and would in most cases automatically correct most engine high load or overload situations that are evidenced by engine lug without operator intervention. Thus, the control system and method of this invention as set forth above would be advantageous for this reason alone.

However, the hydraulically powered cooling fan 34 represents another engine load that can at times be safely shut off or disabled to shed additional engine load. It is safe to do this, however, only when the temperatures of the engine coolant fluid and the hydraulic fluid are less than a first limit for each fluid. The method of this invention thus comprises sensing the engine coolant fluid temperature and the hydraulic fluid temperature at block 118 and then comparing those temperatures to the applicable first limits of each temperature at logic block 120. If these two fluid temperatures are less than the respective first limits and if engine load is greater than 95% such that a reduction in the stroke of traction drive pump 18 would potentially be invoked by controller 36, then controller 36 will, as indicated at block 122, shut off the flow of the hydraulic fluid to cooling fan 34. This additionally removes the load imposed by cooling fan 34 from engine 15, assisting the control system and method of this invention to more quickly and efficiently correct the high load or overload engine conditions and bring the load on engine 15 back down below 95% of full load.

In the description above, one can acceptably disable or shut off cooling fan 34 only for as long as the fluid temperatures remain below the predetermined first limits thereof. Once either temperature reaches the first limit thereof, say when the engine coolant fluid temperature reaches a first limit that is set at 190° F. for such fluid, then the shut off of cooling fan 34 is stopped and cooling fan 34 is turned back on as indicated at block 124. When the fluid temperatures fall back below the first limits thereof after the operation of cooling fan 34 for some period of time, controller 36 will again shut off cooling fan 34 at block 122 as long as the load on engine 15 is still above 95% of full load. While the diminishment of engine load that results from shutting of cooling fan 34 is thus intermittent, it nonetheless will assist controller 36 in returning engine load to less than 95% of full load as quickly as possible.

The operation of the control system and method of this invention comprising the reduction in the stroke of traction drive pump 18 and potentially the shut off of cooling fan 34 is triggered by a sensed engine load of more than 95% of full load as described above. If the load on engine 15 is below that level as will usually be the case during operation of mower 2, the control method and system of this invention does nothing in terms of reducing the stroke of traction drive pump 18 and does nothing in terms of slowing down mower 2 from the ground speed being commanded by traction pedal 24 as indicated at block 105. Thus, for a significant portion of the duration of the operation of mower 2, there is no effect on ground speed.

The control system and method of this invention comprises further improvements that are related to reducing the stroke of traction drive pump 18 to slow mower 2 which improvement do not require the load on engine 15 to surpass 95% of full load to trigger them. One situation is where the engine coolant fluid and hydraulic fluid temperatures have exceeded a predetermined second limit that is higher than the first limit thereof. Taking the example of the engine coolant fluid in which the first limit was at 190° F., the second limit might be set at 210° F. If the fluid temperatures exceed the second limits thereof at any time during operation of mower 2 as indicated at logic block 126, controller 36 will calculate a second maximum ground speed for mower 2 at block 127. This second maximum ground speed will be passed to pump command priority algorithm block 116 to reduce the ground speed of mower 2 by reducing the stroke of traction drive pump 18 to allow cooling fan 34 to catch up with the high temperature situation that has developed in one or both of the two fluids.

Similarly, controller 36 is able to do the same thing in response to an excessive mower deck load situation irrespective of whether or not engine load is greater than 95% of full load. As shown at block 128, this can be done using the speed of rotation of the cutting blades as measured by the deck motor speed sensor 50, or by using the PTO pressure input (in this example the pressure of the hydraulic fluid to the blade drive motor 30) as measured by PTO pressure sensor 52, or both. If the speed of rotation of the cutting blades is less than a predetermined minimum speed as shown at logic block 130, or if the PTO pressure is near the relief pressure setting as shown at logic block 132, then controller 36 acts at blocks 134 and 135 to calculate third and fourth maximum ground speeds. Again, such maximum ground speeds will be passed to block 116 to be used to reduce the ground speed of mower 2 by reducing the stroke of traction drive pump 18 to allow the excessive engine mower deck loads to be alleviated.

Thus, the control system and method of this invention has further safety advantages in potentially addressing and alleviating high fluid temperature conditions and/or high mower deck loads in mower 2. It does so by using controller 36 to temporarily reduce the ground speed of mower 2 by reducing the stroke of traction drive pump 18. It does so even when the overall engine load has not yet climbed to a level higher than 95% of full load. Thus, it proactively addresses and attempts to alleviate situations in which damage might otherwise occur to engine 15 or the hydraulic or cutting systems on mower 2.

The corrective actions that occur when high temperature conditions or high mower deck loads are sensed also are also provided by the controller as noted above in the form of calculated maximum ground speeds for mower 2. Thus, it is possible at any time, that different calculated maximum ground speeds might be fed into the pump command priority algorithm block 116 from blocks 106, 127, 134 and 135. For example, the maximum ground speed coming from block 106 might be 1.5 mph, the maximum ground speed coming from block 127 might be 1.3 mph, and that coming from blocks 134 and 135 might be 1.7 mph. When faced with competing maximum ground speeds, block 116 uses, as indicated at priority block 136 in FIG. 4, the lowest maximum ground speed at any given time as the speed that governs how far to reduce the stroke of traction drive pump 18. When the conditions that gave rise to the lowest maximum ground speed disappear, the priority block 136 then moves to the next highest maximum ground speed until the conditions that gave rise to that ground speed disappear, and so on, until no corrective action of any kind is called for. At this point, controller 36 removes any corrective action from traction drive pump 18 to allow the ground speed of mower 2 to return to the nominal setting provided by traction pedal 24 (or the setting of the cruise control system).

To the extent that any calculated maximum ground speeds are being received by block 116, such speeds can change at any time due to changing external conditions. For example, suppose that a calculated maximum ground speed is being supplied by block 106 based upon a high or overload engine load condition and that such ground speed is calling for a 50% reduction the ground speed being commanded by the operator, i.e. either through traction pedal 24 or the cruise control setting). If in this situation the operator were to turn off the cutting blade drive system, the engine load would rapidly decrease to a point where the 50% reduction would be ended and the ground speed would rapidly rise back to 100%. However, this rise should not be too sudden to risk startling the operator or causing the operation to lose control. In addition, if the situation were reversed and a large reduction in ground speed were suddenly called for due to a rapid rise in engine load, the deceleration in ground speed is desirably controlled to be avoid a violent deceleration and yet is fast enough to reduce the engine load as quickly as possible without causing an engine stall.

Accordingly, as shown in FIG. 4, the calculated maximum ground speed arising due to engine load coming from block 106 is tuned to include acceleration and deceleration limits as indicated at block 138 entitled "Apply ROC limits", ROC standing for rate of change. This tuning of the maximum ground speed to include the rate of change limits is done and the tuned signal is then supplied to priority block 136 for later use in controlling traction drive pump 18. Similar blocks 138 are provided for the other maximum speed change signals arising due to temperatures at block 127, implement operation at 128 and PTO pressure at 129. The ROC limits in the different blocks 138 will be different to be tailored to the appropriate acceleration and deceleration limits best suited to the condition or parameter being sensed.

Instead of using engine speed as the indicator of engine load, some modern engines have internal circuitry that directly calculates and communicates the percentage of load the engine is under at any moment in time. This information is available to the manufacturer of the outdoor power equipment unit over the CAN network typically found in such units. This direct engine load information could be used as shown at block 103b instead of the engine rpm information found at block 103a. As another alternative, the engine could be equipped with some type of load sensor such as load cell, torque sensor, or other power measurement device as indicated at block 103c to provide another way of obtaining the required engine load information.

While this invention has been described herein in conjunction with hydraulic drive and power systems, it is not limited to such hydraulic systems. For example, the hydrostatic transmission 20 could be replaced by a variable speed electric motor for driving the drive wheels, either directly or through a transmission, or by a mechanically driven continuously variable transmission (CVT), etc. The important factor is using some type of traction drive system that allows for a reduction in ground speed to reduce power consumption from the traction drive system when such reduced power consumption is required due to a high or overload engine load condition, excessive fluid temperatures, or excessive work implement loads, or the like.

While the control system and method of this invention have been described in conjunction with a mower in which the work implement comprises a plurality of mower decks, it could be implemented on any outdoor power equipment unit having other types of work implements. Thus, the scope of this invention is to be limited only the appended claims.

The invention claimed is:

1. An outdoor power equipment unit, which comprises:
 (a) a frame carrying a work implement for performing a ground or turf grooming or working operation, the frame also carrying a prime mover whose speed is set by an operator using an adjustable throttle;
 (b) a traction drive system driven by the prime mover for moving the frame over the ground at an adjustable ground speed that is established by an operator using an adjustable speed control;
 (c) an implement drive system driven by the prime mover for moving the work implement in a grooming or working operation;
 (d) a fan drive system driven by the prime mover for powering a cooling fan that cools one fluid in at least one cooling system carried on the frame;
 (e) a sensor for providing an indicator of prime mover load during the working operation being performed by the work implement;
 (f) a temperature sensor for providing a temperature reading of the fluid during the working operation being performed by the work implement; and
 (g) an electronic controller for receiving the prime mover load indicator and temperature inputs from the sensors and for regulating the ground speed of the frame when the prime mover load indicator input is greater than a predetermined percentage of prime mover full load, the electronic controller regulating the speed of the frame in the following manner:
  (i) automatically reducing an output speed of at least one variable speed member contained in the traction drive system to reduce the ground speed of the frame without requiring that the speed control setting established by the operator through the position of the speed control be manually changed by the operator;

(ii) automatically shutting off the cooling fan for periods of time that the temperature input is below a predetermined first limit thereof but resuming operation of the cooling fan when the temperature input reaches or exceeds the first limit thereof; and (iii) and maintaining the automatically reducing and automatically shutting off actions until the prime mover load indicator input drops back below the predetermined percentage of prime mover full load.

2. The outdoor power equipment unit of claim 1, wherein the electronic controller further automatically reduces the output speed of the one variable speed member in the traction drive system to reduce the ground speed of the frame even if the prime mover load indicator input is less than the predetermined percentage of prime mover full load when the temperature input reaches or exceeds a second limit that is higher than the first limit to reduce prime mover load to prevent damage to the cooling system or any components cooled thereby.

3. The outdoor power equipment unit of claim 2, wherein the fluid being sensed by the temperature sensor comprises a coolant fluid cooling the prime mover.

4. The outdoor power equipment unit of claim 2 wherein the fluid being sensed by the temperature sensor comprises a hydraulic fluid used in at least one hydraulic system carried on the frame.

5. The outdoor power equipment unit of claim 2, wherein the fluid being sensed by the temperature sensor comprises a coolant fluid cooling the prime mover, and further including a second temperature sensor for providing a temperature reading of a second fluid used in a second cooling system that is also cooled by the cooling fan, wherein the second fluid being sensed by the temperature sensor comprises a hydraulic fluid used in at least one hydraulic system carried on the frame.

6. The outdoor power equipment unit of claim 1, wherein the prime mover load sensor provides an actual speed of rotation of the prime mover and the prime mover full load is a predetermined reference prime mover speed determined by throttle position.

7. The outdoor power equipment unit of claim 6, wherein the prime mover comprises an internal combustion engine.

8. The outdoor power equipment unit of claim 2, further including a work implement load sensor for providing an indicator of work implement load during the working operation being performed by the work implement, and wherein the electronic controller further automatically reduces the output speed of the variable speed member in the traction drive system to reduce the ground speed of the frame even if the prime mover load indicator input is less than the predetermined percentage of prime mover full load when the work implement load input reaches or exceeds a limit to thereby reduce prime mover load to prevent damage to the work implement.

9. The outdoor power equipment unit of claim 1, wherein the traction drive system comprises a hydraulic traction drive system and the variable speed member comprises a variable speed hydraulic pump.

10. The outdoor power equipment unit of claim 1, wherein the adjustable speed control comprises an adjustable foot pedal or an adjustable cruise control system that permits the operator to establish a desired ground speed.

11. An outdoor power equipment unit, which comprises:

(a) a frame carrying a work implement for performing a ground or turf grooming or working operation, the frame also carrying a prime mover whose speed is set by an operator using an adjustable throttle;

(b) a traction drive system driven by the prime mover for moving the frame over the ground at an adjustable ground speed that is established by an operator using an adjustable speed control;

(c) an implement drive system driven by the prime mover for moving the work implement in a grooming or working operation;

(d) a fan drive system driven by the prime mover for powering a cooling fan that cools one fluid in at least one cooling system carried on the frame;

(e) a first sensor for providing an indicator of prime mover load during the working operation being performed by the work implement;

(f) a second sensor for providing an indicator of work implement load during the working operation being performed by the work implement (g) a temperature sensor for providing a temperature reading of the fluid during the working operation being performed by the work implement; and (h) an electronic controller for receiving the prime mover load indicator, the work implement load indicator, and temperature inputs from the sensors and for automatically reducing an output speed of at least one variable speed member contained in the traction drive system to reduce the ground speed of the frame without requiring that the speed control setting established by the operator through the position of the speed control be manually changed by the operator whenever the following conditions are present:

(i) when the prime mover load indicator input is greater than a predetermined percentage of prime mover full load to thereby reduce prime mover load to enhance the continued ability of the work implement to conduct the grooming or working operator; and (ii) additionally either when the work implement load indicator input reaches or exceeds a limit to thereby reduce prime mover load to prevent damage to the work implement or when the temperature input reaches or exceeds a limit to reduce prime mover load to prevent damage to the cooling system or any components cooled thereby.

* * * * *